United States Patent
Kalafatis et al.

(10) Patent No.: US 7,448,025 B2
(45) Date of Patent: Nov. 4, 2008

(54) QUALIFICATION OF EVENT DETECTION BY THREAD ID AND THREAD PRIVILEGE LEVEL

(75) Inventors: Stavros Kalafatis, Portland, OR (US); Micheal D. Cranford, Hillsboro, OR (US); Scott D. "Dion" Rodgers, Hillsboro, OR (US); Brinkley Sprunt, Lewisburg, PA (US)

(73) Assignee: Intel Corporation, Santa Clara, CA (US)

( * ) Notice: Subject to any disclaimer, the term of this patent is extended or adjusted under 35 U.S.C. 154(b) by 1223 days.

(21) Appl. No.: 09/751,813

(22) Filed: Dec. 29, 2000

(65) Prior Publication Data

US 2002/0124237 A1 Sep. 5, 2002

(51) Int. Cl.
*G06F 9/44* (2006.01)
*G06F 9/46* (2006.01)

(52) U.S. Cl. .................................. 717/128; 718/107

(58) Field of Classification Search ................ 717/127, 717/128; 712/227; 709/107; 702/186
See application file for complete search history.

(56) References Cited

U.S. PATENT DOCUMENTS

| | | | |
|---|---|---|---|
| 5,524,250 A | 6/1996 | Chesson et al. | |
| 5,557,548 A | 9/1996 | Gover et al. | 702/176 |
| 5,657,253 A | 8/1997 | Dreyer et al. | 702/186 |
| 5,752,062 A | 5/1998 | Gover et al. | 702/186 |
| 5,796,637 A * | 8/1998 | Glew et al. | 702/190 |
| 5,796,939 A | 8/1998 | Berc et al. | |
| 5,835,705 A | 11/1998 | Larsen et al. | 709/107 |
| 5,938,760 A | 8/1999 | Levine et al. | |
| 6,098,169 A | 8/2000 | Ranganathan | 712/227 |
| 6,112,318 A * | 8/2000 | Jouppi et al. | 714/47 |
| 6,205,468 B1 * | 3/2001 | Diepstraten et al. | 709/107 |
| 6,256,775 B1 * | 7/2001 | Flynn | 717/127 |
| 6,356,615 B1 * | 3/2002 | Coon et al. | 377/16 |

OTHER PUBLICATIONS

Power PC 604 RISC Microprocessor User's Manual, Chapter 9: Performance Monitor Microprocessor User's Manual, 1994, p. 9-1 through 9-12.

* cited by examiner

*Primary Examiner*—Tuan Q. Dam
*Assistant Examiner*—Michael J Yigdall
(74) *Attorney, Agent, or Firm*—Blakely, Sokoloff, Taylor & Zafman LLP

(57) ABSTRACT

A method and apparatus for monitoring the performance characteristics of a multithreaded processor executing instructions from two or more threads simultaneously. Event detectors detect the occurrence of specific processor events during the execution of instructions from threads of a multithreaded processor. Specialized event select control registers are programmed to control the selection, masking and qualifying of events to be monitored. Events are qualified according to their thread ID and thread current privilege level (CPL). Each event that is qualified is counted by one of several programmable event counters that keep track of all processor events being monitored. The contents of the event counters can then be accessed and sampled via a program instruction.

28 Claims, 2 Drawing Sheets

QUALIFICATION OF EVENT DETECTION BY THREAD ID AND THREAD PRIVILEGE LEVEL

FIELD OF THE INVENTION

The present invention relates generally to the field of processors and, more specifically, to a method and apparatus for monitoring the performance of multithreaded processors.

BACKGROUND AND RELATED ART

In a typical processor system, one or more applications are running (i.e., being executed by the processor). As known in the art, the code of an application can be divided into a plurality of processes and each process can be divided into a plurality of threads. Thus a thread can be a series of instructions that are executed by the processor to achieve a given task (e.g., a subroutine). Processors are often switching between threads of a process and between processes of one or more applications (e.g., in a multi-tasking environment), but these single-threaded processors, as they are currently known in the art, are only capable of supporting one thread of execution at time. In other words, single-threaded processors cannot execute instructions over two or more threads simultaneously, and the use of multiple threads requires that these processors continuously switch back and forth between threads. However, recent advancements in processor technology have allowed the development of multithreaded processors that can support two or more threads of execution simultaneously.

Before the development of simultaneous multithreading, computer architects could further improve the performance of their machines by measuring and monitoring the various parameters that affect the performance of the processor. For example, by measuring the system performance of the machine when it executes its intended applications, the computer architect is better assisted in his or her effort to design a balanced computer system. System performance monitoring is typically accomplished with the use of on-chip performance registers which can monitor certain processor events that can characterize processor performance. For example, in several models of the Intel Pentium® processor, the following performance registers are provided on-chip: a 64-bit Time Stamp Counter (TSC), two programmable event counters (CTR0, CTR1), and a control and event select register (CESR). The CESR can be programmed to allow the event counters (CTR0, CTR1) to count the occurrence of specific events or to count clock signals while an event condition is present or absent. For example, by placing the appropriate date values into the CESR, the first counter, CTR0, can be set up to count the number of times a data read operation is performed by the processor. Once CTR0 is set up to perform this task, each time the processor performs a data read operation, CTR0 increments its internal count. Similarly, the CESR can be programmed to allow the second counter, CTR1, to simultaneously count a different event. The event counts that are ultimately stored in the registers of event counters (CTR0, CTR1) can be accessed by a user in order detect events that characterize a processor's performance. There are numerous events that can be monitored using this system such as data cache read/write misses, loading of a segment registers, etc.

The performance monitoring system described above is useful to software programmers. For example, the performance monitoring system can detect events that tend to indicate inefficiencies in the design of software applications. In addition, processor designers and computer architects can also benefit since the system allows them to observe how software applications will execute on the processor. Therefore, hardware designs can be optimized to deliver the best performance for the execution of common software (e.g., operating systems).

A drawback of the aforementioned performance monitoring system is that it primarily focuses on the operation of the processor without consideration as to which thread, of a multithreaded processor, is being executed. For example, in a multimedia application that combines both audio processes and video processes, the user could use the foregoing system to determine a greater than normal number of data cache read/write misses have occurred during the execution of the application. Using techniques currently known in the art alone, however, the user would not be able to determine which individual threads of execution, e.g., those contained in the audio or video processes, were contributing to the number of data cache read/write misses. This limitation is even more problematic in multithreaded processors, wherein threads are executed simultaneously, because keeping track of when a processor switches between threads will not be sufficient to determine precisely at which thread an event has occurred. Ultimately, if a particular event that is being monitored is adversely affecting the operation of an application, it would be advantageous to determine from which thread and at what privilege level the event is occurring.

What is needed then is a method and apparatus for detecting events that are generated by a specific thread, or set of threads, of a multithreaded processor. As will be seen, the present invention can determine if certain events are generated from an individual thread or from a series of threads executing simultaneously. In general, the present invention can accomplish this by combining event qualification by thread ID with event qualification by thread current privilege level (CPL).

SUMMARY OF THE INVENTION

In one embodiment of an apparatus of the present invention a multithreaded processor is provided that is adapted to execute instructions over a plurality of threads simultaneously. The processor includes at plurality of event detectors adapted to detect the occurrence of specific processor events during the execution of processor instructions. The processor also includes a plurality of specialized event select control registers which are programmed to control the selection, masking and qualifying of events to be monitored. Events are qualified by their thread ID and thread current privilege level (CPL) such that the present invention can attribute the processor event to the execution of a specific thread. Events that are qualified are ultimately counted by one of several programmable event counters that keep track of all processor events being monitored. The contents of the event counters can be accessed and sampled via a program instruction thus providing information concerning processor performance.

BRIEF DESCRIPTION OF THE DRAWINGS

The present invention will be understood more fully from the detailed description which fools and from the accompanying figures, which, however, should not be taken to limit the invention to the specific embodiments shown but are for explanation and understanding only.

DETAILED DESCRIPTION

Figure 1:
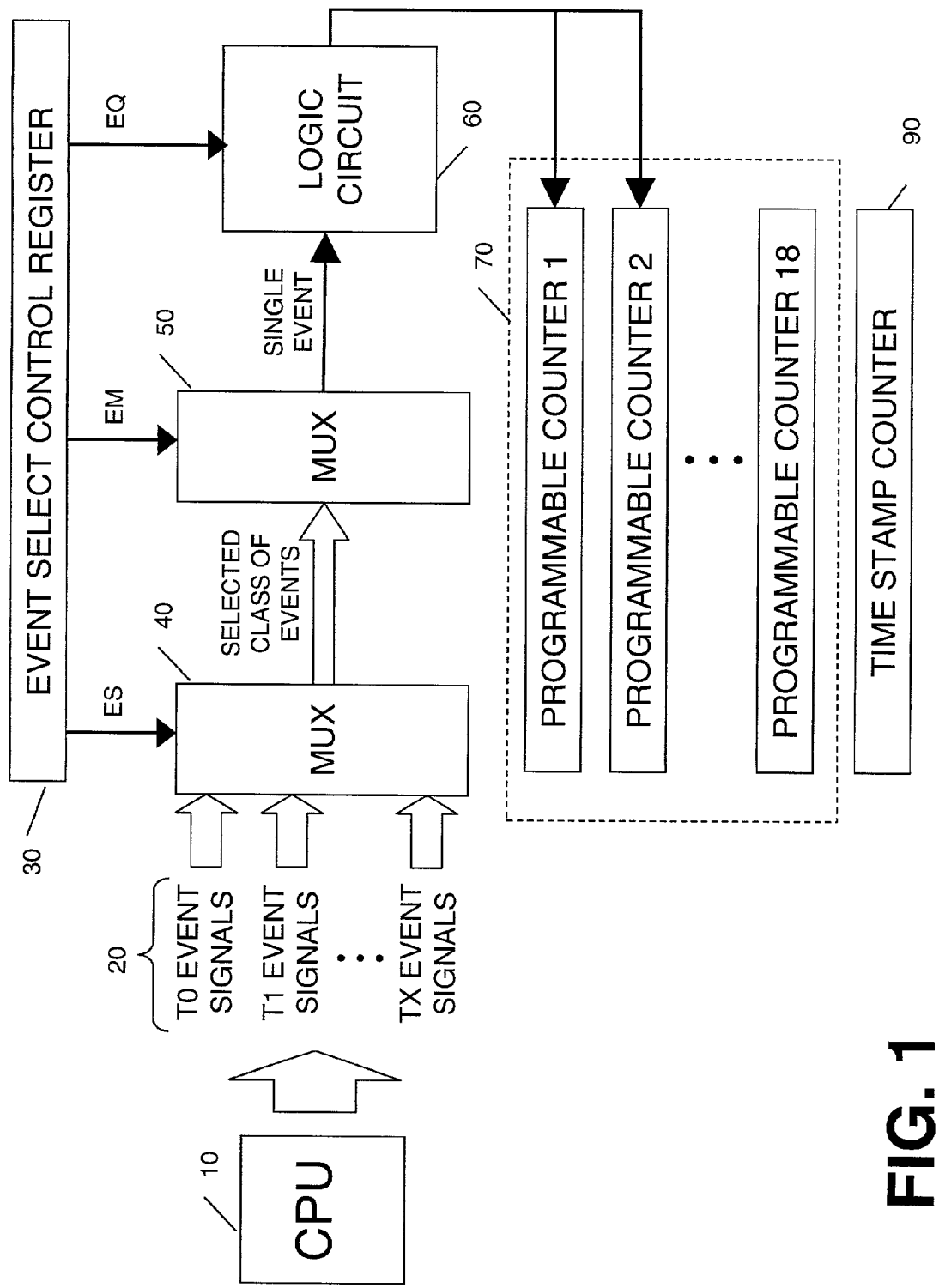
FIG. 1 is a block diagram of the performance monitor feature of the present invention.

A method and apparatus for monitoring events that contribute to the performance of a multithreaded processor is described. In general, the current invention is used to characterize multithreaded processors in real systems on a per-thread basis. This characterization can be used to tune (or improve) application and operating system performance. This capability is key to getting a computer system to operate at a desired level of performance when tuning, for example, multi-media and/or real-time applications. In the following description, numerous specific details are set forth such as event types, bit lengths, register quantities and sizes, etc., in order to provide a thorough understanding of the present invention. It will be obvious, however, to one skilled in the art that these specific details may not be needed to practice the present invention. In other instances, well-known computer architectural elements and electrical circuits have not been described in particular detail in order to avoid unnecessarily obscuring the invention.

For the purposes of the present invention, the term "multithreaded processor" shall be taken to refer to any machine that is capable of executing a sequence of instructions (e.g., macro- or microinstructions) over a plurality of internal threads simultaneously. In addition, a "processor" shall be taken to include, but not be limited to, general purpose microprocessors, special purpose microprocessors, graphics controllers, audio controllers, multi-media controllers, microcontrollers, or network controllers. Further, the term "processor" shall be taken to refer to, inter alia, Complex Instruction Set Computers (CISC), Reduced Instruction Set Computers (RISC), or Very Long Instruction Word (VLIW) processors.

For the purposes of the present invention, the term "event" shall be taken to refer to any logic signal or other electrical signal that indicates the occurrence or duration of some particular activity on the multithreaded processor. For example, both hardware performance events (usually referred to as EMON events) and microbreakpoint events can be detected by the present invention. EMON events are used to understand how an application or operating system is performing and refer to the occurrence or duration of processor activity generated by hardware/software interactions. Microbreakpoint events are used for debugging and allow designers to freeze the operation of a processor once a certain number of these events occur. Typically, the signals which comprise the list of events monitored by the present invention are ones which already exist or are generated as part of the normal operation of the multithreaded processor.

Certain exemplary embodiments of the present invention are described as being implemented primarily in either hardware or software. It will nonetheless be appreciated by those skilled in the art that many features may readily be implemented in hardware, software or a combination of hardware and software.

An example of a computer architecture including an embodiment of the present invention is show in FIG. 1. FIG. 1 illustrates an integrated circuit comprising a multithreaded processor 10 having a central processing unit (CPU) which is capable of executing a sequence of instructions. Included on the integrated circuit is an apparatus for monitoring the performance of the multithreaded microprocessor—particularly the various parameters and events associated with the normal operation of the processor.

In one embodiment of the invention, multithreaded processor 10 is divided up into four local areas and each local area is further divided up into local sub-areas. The total number of sub-areas in processor 10 is twenty-four, and the number of sub-areas in each area varies between three and eight. Each local sub-area contains two event selection control registers (ESCRs). Each ESCR is capable of controlling the detection of events generated from its respective local sub-area. Processor 10 also contains event counters 70 which includes a total of eighteen 40-bit programmable event counters. In addition, each of the four aforementioned local areas contain between four and six event counters. Each ESCR of processor 10 is capable of coupling to an individual event counter as long as that event counter is contained within the same respective local area. For example, ESCR 30 is one of the many ESCRs utilized for controlling parts of event counters 70. As seen in FIG. 1, ESCR 30 may couple to programmable counter 1 or programmable counter 2 because they are contained within the same local area as ESCR 30; however, ESCR 30 may not couple to programmable counter 18 because it is not contained with the same local area.

Figure 2:
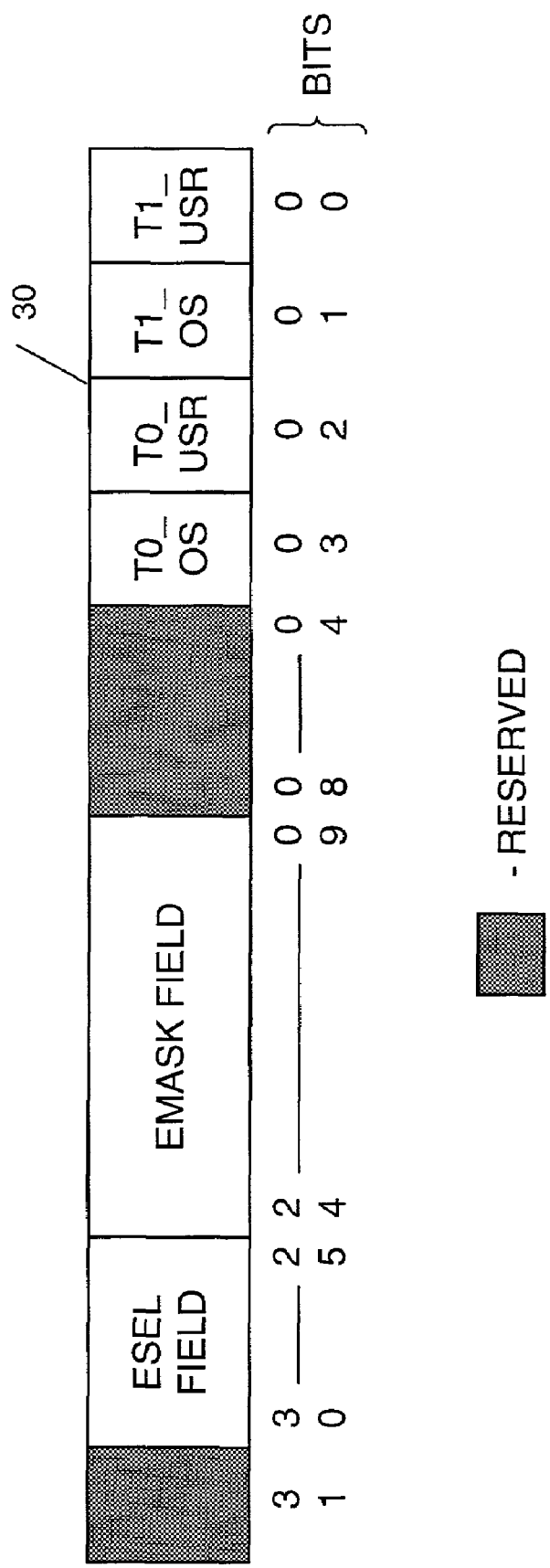
FIG. 2 illustrates the control and event select register for controlling event selection, masking, and qualification.

ESCR 30 controls event selection, masking, and qualification. ESCR 30 accomplishes these tasks via several fields of programmable bits. As illustrated in FIG. 2, these fields include a 6-bit event selection (ES) field, a 16-bit event mask (EM) field, and four additional event qualification (EQ) bits (T0_USR, T0_OS, T1_USR, T1_OS). As mentioned earlier, ESCR 30 is capable of coupling to several programmable event counters represented by event counters 70. The contents of each event counter of event counters 70 may be programmed by an instruction from processor 10, and the programming of an event counter will initiate its coupling to an ESCR such that it may begin counting a selected event. It should be understood that the quantity of either the event counters or the ESCRs may be different in alternate embodiments without consequence to the practice of the present invention.

Event monitoring begins when event signals are transmitted by event detectors contained in multithreaded processor 10. These event signals include such things as cache hits, clock pluses, address generation interlocks, etc. In one embodiment of the invention, processor 10 contains between forty and fifty event detectors, and each detector is capable of detecting the occurrence of a specific event during the simultaneous execution of one or more threads (T0, T1, . . . TX). The detection of events will trigger the transmission of event signals 20 from processor 10 to a set of two multiplexers in series (MUXs 40 and 50). The first step of event selection occurs when the ES field of ESCR 30 instructs MUX 40 to select a class of events from event signals 20 to be further multiplexed by MUX 50. Subsequently, the EM field of ESCR 30 instructs MUX 50 to select a subclass of events to masked—leaving, ultimately, only a single event signal transmitted to logic block 60.

An example of a class of events that may be selected by the ES field is branches retired. This class can be further divided into six subclasses of branches retired: micro, macro, not taken, taken, predicted and mispredicted. The EM field will effectively filter out the subclasses of events that are not to be counted, leaving only one subclass of branches retired to be qualified (e.g., micro-branches retired).

After event selection and masking, an event must qualify under an additional set of conditions before it is counted by an event counter. Event qualification occurs at logic block 60 and is controlled by the values set in the four EQ bits (T0_USR, T0_OS, T1_USR and T1_OS) of ESCR 30. The functions of these bits are shown in Table 1 below. These bits are set in a specific order to qualify an event by thread ID and by thread current privilege level (CPL). The thread ID indicates the event source, i.e., the thread at which the event occurred. The thread CPL indicates the privilege level that the thread was operating at when the event occurred. A CPL of 0 indicates that thread was executing an application level instruction, and a CPL of 1, 2, or 3 indicates that the thread was executing a supervisor level instruction. For example, CPL qualification makes it possible to distinguish between system level (OS) cache miss rates and user (USR) level cache miss rates.

TABLE 1

| BIT | NAME | DESCRIPTION/FUNCTION |
|---|---|---|
| 0 | T1_USR | IF (Thread = T1) AND (T1_CPL = 1 \| 2 \| 3), output event count |
| 1 | T1_OS | IF (Thread = T1) AND (T1_CPL = 0), output event count |
| 2 | T0_USR | IF (Thread = T0) AND (T0_CPL = 1 \| 2 \| 3), output event count |
| 3 | T0_OS | IF (Thread = T0) AND (T0_CPL = 0), output event count |

It will be understood that the use of the present invention is not limited to multithreaded processors containing only two threads (T0 and T1). The present invention can be used with processors utilizing a plurality of threads, and this is achieved by expanding the number of EQ bits utilized in the event select control registers.

It will be appreciated that by combining event qualification by thread ID with event qualification by thread current privilege level (CPL), a finer degree of qualification is provided than would be available if instead two sets of bits were defined: one set to qualify by thread and one set to qualify by CPL (e.g., four bits T0, T1, OS, and USR). For example there is no way to get the effect of setting the T0_USR and T1_OS bits using T0, T1, OS, and USR bits alone.

Logic block 60 qualifies an event by logically testing its thread ID and thread CPL against the conditions set forth by the EQ bits. For example, if both the T0_OS and T1_OS are set, then only events generated by T0 (thread 0) or T1 (thread 1), while their respective CPL values are equal to zero, will be detected and reported to event counters 70. Similarly, if only the T0_USR and T0_OS bits are set, then only events generated by T0 at any privilege level will be reported to event counters 70. If all of the above bits are set, then essentially no qualification is made with respect to thread ID or CPL and all events detected will be reported to event counters 70. Any event that is not qualified by logic block 60 is rejected and is never counted.

The events to be monitored by the present invention may be considered to be of two types: those that count occurrences and those that count durations. Occurrence events are counted in a single clock cycle. If an event can happen twice in one clock cycle, the counter is incremented by two. For duration events, event counters count the total number of clocks that the condition is true.

The performance monitoring apparatus further comprises time stamp counter 90 which increments on every clock cycle of multithreaded processor 10. In one embodiment, time stamp counter 90 is a dedicated, free-running 64-bit counter which continues to count unless specifically reset, preset or disabled by processor 10. One way that event counters 70 may be accessed is by a user level read time stamp counter instruction. This instruction is provided to allow a program of any privilege level to sample the value of an event counter. This occurs without disruption of the count or operation of the processor. The operating system may also disable the time stamp counter feature in secure environments.

A supervisor mode program can be used to access and sample the contents of any one of the eighteen event counters, of event counters 70, at any time using a read from model-specific register (RDMSR) instruction provided for in one embodiment. It should be noted that an event counter is cleared whenever the processor is reset. A supervisor mode program may also reset or preset an event counter using a write to model-specific register (WRMSR) instruction. Either the RDMSR or WRMSR instructions copy the contents of the specific counters into a pair of registers. Each of these event counters may also be programmed to count any event from a predetermined list of events. The events to be counted by event counters 70 are selected by programming one of the ESCRs, such as ESCR 30.

Each event counter is controlled independently by one of forty-eight event control registers. This means that in addition to programming, each event counter of FIG. 1 can be either enabled or disabled simultaneously. This feature allows the event counters to operate in concert with each other, thereby maintaining synchronous counting as a function of time. It will be appreciated that this feature is critical in a multi-threaded processor where multiple threads are operating simultaneously and, therefore, may be generating events simultaneously. Furthermore, since monitoring particular aspects of a processor's performance sometimes requires the calculation of specific rates (e.g., cache miss rates, hit rates, clocks per instruction, etc.) it is critical that the synchronous operation of the event counters be preserved.

At any time during the monitoring process, system software can program/sample the contents of each of the registers of event counters 70 through the execution of a single instruction: the WRMSR instruction for programming and the RDMSR instruction for sampling. The act of reading the counters does not disturb the operation of the counters themselves; that is, the contents of the registers of event counters 70 may be accessed in a non-intrusive manner by utilizing an RDMSR instruction. Moreover, event counters 70 are non-intrusive to multithreaded processor 10; that is, the counting of certain events does not alter the behaving or slow down the operation of the processor.

As an example of the versatility of the present invention consider as an example the situation in which three threads of a processor are operating simultaneously and it is desirable to monitor user-level cache miss rates of the first thread as compared to user-level cache miss rates of both the second and third thread. For this situation, one event counter can be programmed to count the read/write operations which occur in the first thread operating at a CPL of 1, 2, or 3. Another counter can be programmed to count the number of misses. Together, these two event counts can be used to derive the cache miss rate in the first thread (the number of read/writes divided by the number of misses). Similarly, this method can be applied to the second and third threads, and the present invention will allow the counting of events generated by all three threads operating simultaneously. In general, the performance monitor feature can be used to monitor a few key events, which can then be combined to generate statistics on the operation of the processor.

Whereas many alternations and modifications to the present invention will no doubt become apparent to one skilled in the art after having read the foregoing description, it is to be understood that the particular embodiments shown and described by way of illustration are in no way intended to be limiting. For example, although this disclosure has mentioned specific events that may be monitored for purposes of illustration, other events, conditions or signals may also be monitored without detracting from the spirit or scope of the present invention. Therefore, reference to the details of the illustrated diagrams is not intended to limit the scope of the claims which themselves recite only those features regarded as essential to the invention.

What is claimed is:

1. An apparatus, comprising:
   a processor to execute a plurality of threads simultaneously, each thread including a series of instructions and resulting in an event;
   an event selection control register (ESCR) coupled to the processor;
   a first multiplexer coupled to the ESCR to select a class of events, based on a first set of control signals from the ESCR, from a group of event signals issued from the processor;
   second multiplexer coupled to the ESCR and the first multiplexer to mask, based on a second set of control signals from the ESCR, subclasses of the class of events in order to select an event that belongs to a subclass that is not masked;
   a logic circuit coupled to the ESCR and the second multiplexer to qualify the event based on a thread ID and a thread current privilege level (CPL), the thread ID indicating a source of the event including a thread of the plurality of threads where the event occurred; and
   an event counter to count the event qualified by the logic circuit.

2. The apparatus of claim 1, wherein the ESCR comprises a first field of bits to store the first set of control signals to select the class of events.

3. The apparatus of claim 2, wherein the ESCR further comprises a second field of bits to store the second set of control signals to mask the subclasses.

4. The apparatus of claim 1, wherein the event counter is stopped and cleared before a new event is selected.

5. The apparatus of claim 4, wherein the event counter is preset to a certain state.

6. The apparatus of claim 1, wherein the class of events includes hardware performance and breakpoint events.

7. The apparatus of claim 1, wherein the thread CPL indicates a privilege level at which the thread at which the event occurred was operating when the event occurred.

8. The apparatus of claim 1, further comprising an access location to allow access to the event counter to determine a current count of the event.

9. A method, comprising:
   executing a plurality of threads simultaneously, each thread including a series of instructions and resulting in an event;
   instructing a first multiplexer, based on a first set of signals from an event selection control register (ESCR), to select a class of events from a group of event signals issued from the processor;
   instructing a second multiplexer, based on a second set of signals from the ESCR, to mask subclasses of the class of events in order to select an event that belongs to a subclass that is not masked;
   qualifying the event, by a logic circuit, based on a thread ID and a thread CPL, the thread ID indicating a source of the event including a thread of the plurality of threads where the event occurred;
   counting the event qualified by the logic circuit using an event counter; and
   accessing the event counter to determine a current count of the event.

10. The method in claim 9, wherein the qualifying the event includes requiring that the event has a preselected thread ID.

11. The method in claim 10, wherein the qualifying the event further includes requiring that the event has a preselected thread CPL.

12. The method of claim 11, wherein thread CPL indicates a privilege level at which the thread was operating at when the event occurred.

13. The method of claim 10, wherein the preselected thread ID represents a thread of the plurality of threads where the event occurred.

14. The method of claim 9, wherein the thread CPL indicates a privilege level at which the thread at which the event occurred was operating when the event occurred.

15. A system, comprising:
   a storage medium coupled with a processor, the processor to execute a plurality of threads simultaneously, each thread including a series of instructions and resulting in an event;
   an event selection control register (ESCR) coupled to the processor; a first multiplexer coupled to the ESCR to select a class of events, based on a first set of control signals from the ESCR, from a group of event signals issued from the processor;
   a second multiplexer coupled to the ESCR and the first multiplexer to mask, based on a second set of control signals from the ESCR, subclasses of the class of events in order to select an event that belongs to a subclass that is not masked;
   a logic circuit coupled to the ESCR and the second multiplexer to qualify the event that is to be selected based on a thread ID and a thread current privilege level (CPL), the thread ID indicating a source of the event including a thread of the plurality of threads where the event occurred;
   an event counter to count the event qualified by the logic circuit; and
   an access location to allow access to the event counter to determine a current count of the event.

16. The system of claim 15, wherein the access location allows access to determine the count without disturbing the operation of event counter.

17. The system of claim 16, wherein the ESCR comprises a first field of bits to store the first set of control signals to select the class of events.

18. The system of claim 17, wherein the ESCR further comprises a second field of bits to store the second set of control signals to mask the subclasses.

19. The system of claim 15, wherein the event counter is stopped and cleared before a new event is selected.

20. The system of claim 19, wherein the event counter is preset to a certain state.

21. The system of claim 15, wherein the class of events includes hardware performance and breakpoint events.

22. The system of claim 15, wherein the thread CPL indicates a privilege level at which the thread at which the event occurred was operating when the event occurred.

23. A machine-readable medium having stored thereon data representing sets of instructions, the sets of instructions which, when executed by a machine, cause the machine to:
   execute a plurality of threads simultaneously, each thread including a series of instructions and resulting in an event;
   instruct a first multiplexer, based on a first set of signals from an event selection control register (ESCR), to select a class of events from a group of event signals issued from the processor;
   instruct a second multiplexer, based on a second set of control signals from the ESCR, to mask subclasses of the class of events in order to select an event that belongs to a subclass that is not masked;

qualify the event, by a logic circuit, based on a thread ID and a thread CPL, the thread ID indicating a source of the event including a thread of the plurality of threads where the event occurred;

count the event qualified by the logic circuit using an event counter; and access the event counter to determine a current count of the event.

24. The machine-readable medium of claim 23, wherein to qualify the event includes requiring that the event has a preselected thread ID.

25. The machine-readable medium in claim 24, wherein to qualify the event further includes requiring that the event has a preselected thread CPL.

26. The machine-readable medium of claim 24, wherein thread CPL indicates a privilege level at which the thread was operating at when the event occurred.

27. The machine-readable medium of claim 23, wherein the thread CPL indicates a privilege level at which the thread at which the event occurred was operating when the event occurred.

28. The machine-readable medium of claim 23, wherein the preselected thread ID represents a thread of the plurality of threads where the event occurred.

* * * * *